United States Patent [19]

Menzel et al.

[11] 3,840,058
[45] Oct. 8, 1974

[54] COMBINATION TREE SUPPORT AND STACKING BLADE FOR TREE HARVESTER

[75] Inventors: Alvin Lewis Menzel; Leonard Laverne Shepherd, both of Dubuque, Iowa

[73] Assignee: Deere & Company, Moline, Ill.

[22] Filed: Mar. 19, 1973

[21] Appl. No.: 342,567

[52] U.S. Cl.................... 144/3 D, 144/2 Z, 214/6 G
[51] Int. Cl................................................ B27c 9/00
[58] Field of Search............ 214/6 G; 144/2 R, 2 Z, 144/3 R, 3 D, 34 R, 34 B, 309 AC

[56] References Cited
UNITED STATES PATENTS

| | | | |
|---|---|---|---|
| 3,631,905 | 1/1972 | Karlin | 144/3 D |
| 3,708,000 | 1/1973 | Duffty | 144/3 D |
| 3,734,152 | 5/1973 | Shields | 144/3 D |
| 3,763,905 | 10/1973 | Hamilton et al. | 144/3 D |

Primary Examiner—Andrew R. Juhasz
Assistant Examiner—W. Donald Bray

[57] ABSTRACT

An articulated, four-wheel drive tree harvesting machine includes a front frame section upon which a felling boom assembly, a delimbing assembly and a feed assembly are mounted. The felling boom assembly is operable for severing a tree and lowering the same into a generally horizontal disposition from where the trunk of the tree may be released for engagement by feed rolls of the feed assembly and for encirclement by blades of the delimbing assembly. Once a tree is released by the felling boom assembly, the feed rolls may be operated to draw the tree trunk through the delimbling blades along a path extending alongside the vehicle. A tree support structure for supporting a tree as it is being delimbed is fixed integrally with a stacking blade that is vertically swingably mounted at the rear end of the rear frame section.

7 Claims, 2 Drawing Figures

PATENTED OCT 8 1974 3,840,058

3,840,058

COMBINATION TREE SUPPORT AND STACKING BLADE FOR TREE HARVESTER

BACKGROUND OF THE INVENTION

The present invention relates to a tree harvesting machine for felling and delimbing trees and more particularly relates to a combined tree support and stacking blade assembly for such a machine.

Tree harvesting machines are known which fell a tree and delimb the same by feeding it horizontally through delimbing blades of a delimbing assembly. Most of these known machines either have a continuous bed which extends from the delimbing assembly to support the trunk of a tree passing through the assembly or have a fixed support spaced from the delimbing assembly and positioned for supporting a tree trunk when the latter has moved a predetermined distance through the delimbing assembly. Thus, a tree trunk passing over these fixed supports cannot be disposed at a level any higher than that determined by the position of the supports. This operation is not entirely satisfactory since at times it may be desired to guide a tree being delimbed so that it is elevated, for example, to rest upon a bank of snow or to be deposited on top of a pile of delimbed trees. Also, trees are more limber in the summer than they are in the winter and in the case of the spaced fixed support, a tree being delimbed may bend to a position wherein it passes below the fixed support and may run into the ground and cause damage to the delimbing blade or feed assemblies.

Accordingly, it is a broad object of the invention to provide a tree harvesting machine which includes a tree support that overcomes the disadvantages, noted above, of the tree supports of existing machines. Specifically, it is an object to provide a tree harvesting machine including a vertically adjustable tree support. Still more specifically, it is an object to provide such a tree support which is formed integrally with a stacking blade assembly.

A further object of the invention is to provide a tree support, as described above, having an upwardly facing surface which has an upper central section from which inclined sections extend towards and away from the delimbing assembly.

Still another object of the invention is to provide a tree support, as above described, having an inner vertical plate extending alongside one side of the vehicle in continuous relationship to the upper surface of the support so as to guide tree trunks passing over the support.

Still another object of the invention is to provide a tree support which is fixed to the upper portion of one end of a stacking blade assembly.

These and other objects will become apparent from the following description and the appended drawing.

SUMMARY OF THE INVENTION

According to the present invention, there is provided a tree harvesting machine including an articulated frame comprising a rear section on which is located an integral tree support and stacking blade assembly and a front section on which is located felling boom, delimbing and feed assemblies.

The front and rear frame sections are each supported on a pair of driven ground wheels and the delimbing and feed assemblies are arranged such that a tree trunk being delimbed passes generally longitudinally of the machine along a predetermined path extending generally horizontally over one of each of the front and rear pairs of wheels and next to one side of a cab and engine located on the rear frame.

The stacking blade assembly is vertically adjustable and a tree support member is fixed to one side of the upper portion of the stacking blade assembly so as to be in alignment with the path normally followed by a tree trunk. The tree support member includes an upwardly facing surface which is inclined oppositely from an upper central portion respectively towards and away from the delimbing assembly. Thus, the inclined surface extending towards the delimbing assembly acts to intercept and deflect tree trunks so as to guide the latter over the top of the surface while the inclined portion of the surface extending away from the delimbing assembly acts to deposit a tree trunk once the majority of the weight thereof has caused it to tilt downwardly against the last-named inclined surface.

DESCRIPTION OF THE PREFERRED EMBODIMENT

Figure 1:
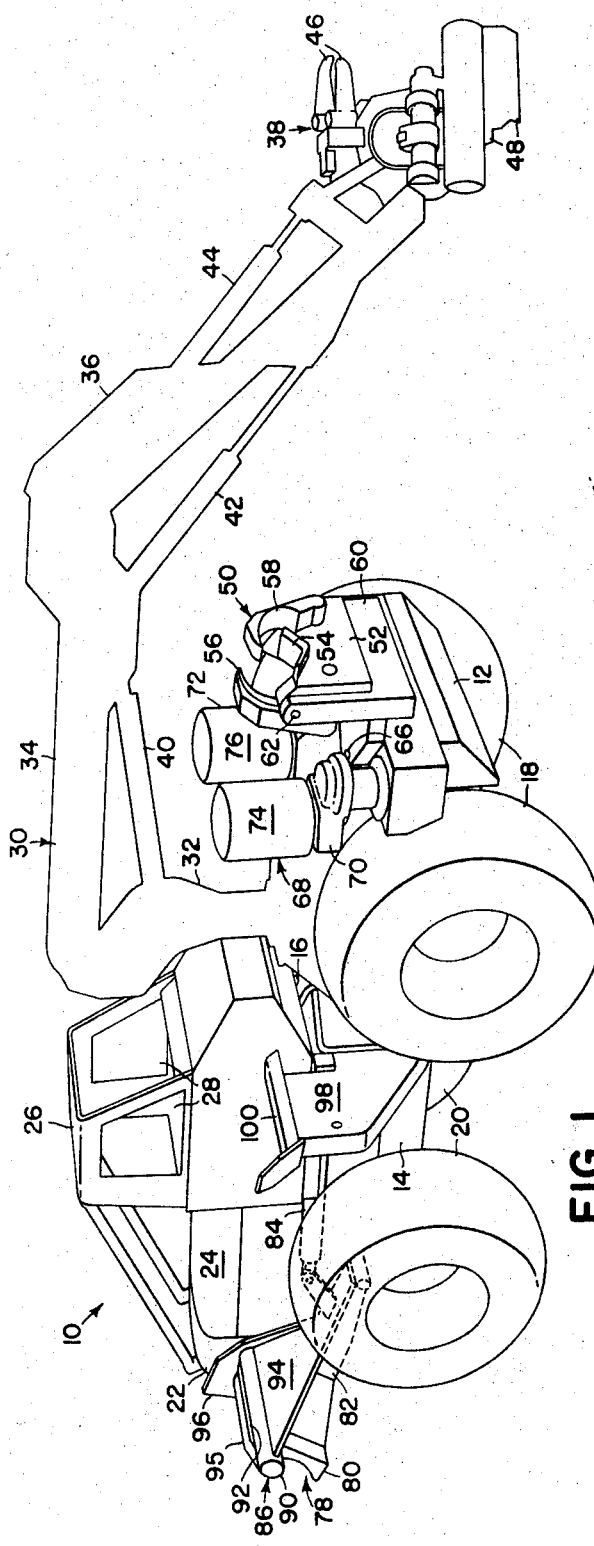
FIG. 1 is a perspective overall view of a tree harvesting machine embodying a tree support structure constructed according to the principles of the present invention.
Figure 2:
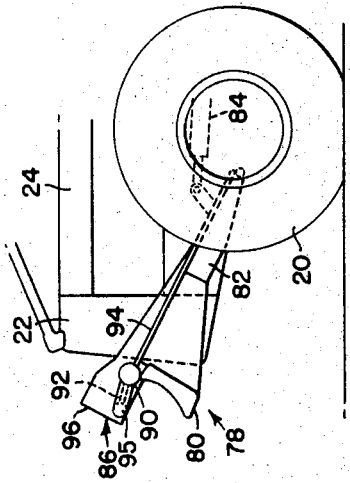
FIG. 2 is a side view of the tree support structure showing its connection to the stacking blade assembly.

Referring now to FIG. 1, therein is shown a tree harvesting machine indicated in its entirety by the reference numeral 10. The machine 10 includes an articulated chassis comprising front and rear frame sections 12 and 14, respectively, which are connected together for relative movement about a vertical pivot axis defined by pin means, shown partially at 16. The front and rear frames are supported by front and rear pairs of driven ground wheels 18 and 20, respectively.

Mounted centrally on the rearmost portion of the rear frame section 14 is a radiator housing 22 in which a radiator and other components, not shown, are located. Forming a forward continuation of the radiator housing 22 is an engine housing 24 in which an engine, not shown, is located. The forward end of the engine housing 24 terminates at the rearward wall of a cab 26 which is mounted on the foremost portion of the rear frame section 14. The cab 26 is provided with a plurality of windows, indicated at 28, located so as to permit an operator seated in the cab to see the operation of various components of the machine.

Mounted on the rear portion of the front frame section 12 just forwardly of the pivot pin 16 is a shear or felling boom assembly 30. The shear boom assembly comprises an upright support post 32 that is journaled in the front frame section for rotation about a vertical axis. Hydromechanical drive means (not shown) are connected to the lower end of the post 32 for selectively rotating the same. A first boom section 34 has opposite ends respectively pivotally connected to the upper end of the post 32 and to one end of a second boom 36 for swingable movement about respective parallel horizontal axes. A felling head structure 38 is in turn pivotally connected to the other end of the boom section 36 for pivotal movement about a generally horizontal axis which is parallel to the last-mentioned axes. A trio of extensible and retractable hydraulic actuators 40, 42 and 44 are mounted between the upright post 32 and the first boom section 34, between the first boom section 34 and the second boom section 36 and between the second boom section 36 and the felling head structure 38, respectively, for selectively swinging the boom sections and the felling head structure vertically relative to each other and to the upright post 32. The felling head structure 38 includes a pair of grapple tongs 46 located above a pair of shear blades 48, the pair of tongs and pair of blades each being movable towards and away from each other respectively for grasping and for severing a tree trunk or stem located therebetween.

Mounted on the right-hand side of the forward end portion of the front frame section 12 is a delimbing assembly 50 including a subframe 52 having a V-shaped blade 54 fixed to the top thereof and arranged to support a tree trunk disposed along a predetermined path extending longitudinally of the harvesting machine.

Located at the right- and left-hand sides of the V-shaped blade 54 are blades 56 and 58, respectively, which cooperate with the V-shaped blade to encircle a tree trunk supported by the V-shaped blade. The blades 56 and 58 are curved so as to approximate the curvature of a tree trunk and are fixed to respective arms which are pivotally connected to the front frame 52 for swinging laterally towards and away from each other about respective fore-and-aft axes. To ensure that the blades will be properly disposed with respect to a tree trunk gripped thereby, the subframe 52 is located between and pivotally connected to the opposite legs of a U-shaped blade support frame 60 for movement about a transverse horizontal pivot axis defined by right- and left-hand journal connections located at the upper ends of the legs above the V-shaped blade 54, the right journal connection being shown at 62. The blade support frame 60 is in turn pivotally mounted on the frame section 12 for swinging about a vertical axis 66 defined by connection means at the rearward side of the frame 60. Thus, the frames 52 and 60 may pivot to align themselves with tree trunks or tree trunk portions which are angled from a predetermined generally horizontal fore-and-aft path so that the blades 56 and 58 are always disposed to cut limbs off as closely as possible to the trunk of the tree.

A tree feed assembly 68 is located rearwardly of the blade assembly 50 for propelling a tree trunk rearwardly when the trunk is encircled by the blades thereby causing the limbs to be cut from the trunk. The feed assembly includes right- and left-hand feed roll structures 70 and 72, respectively. The feed roll structures 70 and 72, respectively, include cylindrical feed rolls or drums 74 and 76 which are mounted, in a manner not shown, for being driven about their respective vertical longitudinal axes and for being swung about respective vertical axes spaced from said longitudinal axes. Although the rolls 74 and 76 are here shown as being smooth surfaced, the rolls would normally be provided with spikes or some other means for aggressively engaging a tree trunk.

Mounted at the rearward end of the tree harvesting machine 10 is a conventional vertically adjustable stacking blade assembly 78 including a transversely extending blade 80 fixed integrally with a pair of forwardly extending push arms, one of which is shown at 82, the push arms each having their forward ends pivotally connected to the opposite sides of the rear frame section 14. The push arms 82 are raised and lowered vertically about their connection with the main frame through means of a pair of hydraulic actuators, one being shown at 84. Secured to the right-hand end portion of the blade 80 and the right-hand push arm 82 at a location in fore-and-aft alignment with the path travelled by a tree being delimbed is a tree support member 86 arranged for supporting a tree as it is being delimbed. The tree support member 86 includes an outer structure fixed at its underside to the upper portion of the blade 80 and including an intermediate horizontally disposed generally cylindrical member 90 from which extends downwardly and rearwardly, and downwardly and forwardly inclined gusset-like plates 92 and 94, respectively, the plate 92 being bordered by a tubular member 95. The inner end of the outer structure, hence the inner end of the cylindrical member 90 and the inner edges of the plates 92 and 94 are fixed to a vertical guide plate 96 which extends alongside the rear frame section 14 and has its lower edge fixed to the adjacent push arm 82. Thus, it will be appreciated that the tree support member 86 may be adjusted vertically to properly dispose it for supporting a tree trunk being delimbed.

A further structure for supporting and handling tree trunks during and after delimbing is secured to the rear frame section 14 in the vicinity of the cab 26 and comprises a bracket 98 to which a retainer-ejector arm 100 is vertically swingably mounted for movement between a support position as shown, when the arm lies generally horizontally above the bracket 98 and a dump position wherein the arm 98 extends generally vertically at the outer side of the bracket. Thus, it will be appreciated that if the weight distribution of a tree trunk being delimbed is not such that the majority of the trunk weight is rearwardly of the tree suppot member 86 by the time that the trunk has passed through the feed rolls 74 and 76, the retainer-ejector arm can be swung to the dump position to deposit the delimbed tree trunk to the right-hand side of the machine 10.

In operation, assuming the delimbing machine 10 to be at a harvesting site, the operator will control the shear or felling boom assembly 30 so as to position the felling head structure 38 against a selected tree to be sheared, the grapple tongs 46 then being closed upon the tree and the shear blades 48 then being operated to shear the tree. Once the tree is sheared, the hydraulic actuators 40, 42 and 44 are selectively actuated so as to tilt the tree to a generally horizontal position and to position the butt portion of the tree, now located in the shear head structure 38, to a position above and between the two feed rolls 74 and 76 and the two shear blades 56 and 58, the rolls and blades being in respective open positions wherein they are spread apart from each other. The tree is then released from the shear head structure by opening the grapple tongs 46 and the thus released tree falls upon the V-shaped delimbing blade 54. The delimbing blades 56 and 58 are then actuated so as to close upon the trunk of the tree and cooperate with the V-shaped blade 54 to encircle the trunk of the tree. The feed rolls 74 and 76 are likewise actuated to engage the trunk of the tree and the feed roll drive is then actuated into a forward driving mode and is engaged to drive the feed rolls 74 and 76 to pull the tree trunk through the delimbing blades 54, 56 and 58.

Assuming that it is desired to have the delimbed tree trunk to fall directly onto the ground, the stacking blade assembly 78 will normally be in a vertical position which will dispose the cylindrical member 90 of the tree support member 86 at a height corresponding to that of the V-shaped delimbing blade 54. If the butt end of the tree trunk is lower than the cylindrical member 90 as it approaches the member, then it will contact the plate 94 and be guided upwardly so as to pass over the top of the cylindrical member 90. Once the tree trunk has passed through the feed rolls 74 and 76, the weight of the tree portion rearwardly of the cylindrical member 90 will normally be sufficient to cause the tree to tilt downwardly against the tubular member 95 which guides the tree until the butt end thereof contacts the ground at the rear of the harvesting machine. Then as the tree harvesting machine is driven forwardly, the tree will normally drop in place. In the event that the portion of the tree rearwardly of the support member 86 is not heavy enough to cause the tree to tilt downwardly, the tree trunk may be deposited to the right-hand side of the machine by actuating the retainer-ejector arm 100 so as to move the latter from its support to its dump position.

If the trunks of the trees being delimbed are unusually limber, the stacking blade assembly 78 will normally be moved to a vertical position whereat the cylindrical member 90 of the tree support member 86 is disposed at a height somewhat below that of the V-shaped delimbing blade 54. This disposition of the blade assembly 78 will ensure that at least the forwardmost portion of the plate 94 will be located low enough to intercept the butt end of a sagging tree trunk, the plate 94 then guiding the tree trunk over the top of the cylindrical member 90 as described above.

Assuming that it is desired to stack a delimbed tree trunk on a pile of trees located rearwardly of the machine 10, then the stacking blade assembly 78 will be adjusted vertically so as to dispose the cylindrical member 90 of the tree support member 86 at a level somewhat above that of the V-shaped delimbing blade 54. Again, the plate 94 is utilized to intercept an oncoming tree trunk butt and to deflect the tree trunk upwardly so that it will pass over the top of the cylindrical member 90. This same operation would be used when a snow bank or any other obstruction is located just rearwardly of the vehicle and it is desired to place the delimbed tree trunks on top of the snow bank or obstruction.

We claim:

1. In a vehicle having a main frame means supported by ground-engaging means, a tree processing mechanism for advancing a tree along a fore-and-aft extending path adjacent one side of the main frame means and a stacking blade structure including a blade extending transverse to and being vertically movably mounted at one end of said frame means, the improvement comprising: a tree support member being fixed to said stacking blade structure and including a structure extending transversely to said frame means and having an upwardly facing support surface arranged along said fore-and-aft path for supporting tree trunks as they are advanced by said processing mechanism.

2. The vehicle as defined in claim 1 wherein said outwardly extending structure is fixed to an upper portion of said blade.

3. The vehicle as defined in claim 2 wherein said outwardly extending structure includes a central tubular member extending parallel to said upper portion of said blade and having a gusset-like plate fixed thereto and inclined downwardly therefrom in the direction of said tree processing mechanism.

4. The vehicle as defined in claim 3 wherein said outwardly extending structure further includes a second gusset-like plate member fixed to and inclined downwardly from said tubular member in the opposite direction from said processing mechanism.

5. The vehicle as defined in claim 4 wherein said blade structure includes a pair of push arms fixed to said blade and arranged at opposite sides of said frame means and said tree support member including a vertical guide plate extending fore-and-aft alongside said main frame means and being connected to one of said push arms and to inner portions of said tubular member and said gusset-like plate members.

6. The vehicle as defined in claim 1 wherein said outwardly extending structure includes first and second plate-like portions which incline downwardly oppositely from a central portion which extends transversely to said main frame.

7. The vehicle as defined in claim 6 wherein said tree support member includes a vertical, fore-and-aft extending guide plate being positioned alongside said main frame means and being fixed to said outwardly extending structure.

* * * * *